United States Patent

[11] 3,618,817

[72] Inventor Thomas D. Troughton
 Richmond, Calif.
[21] Appl. No. 37,107
[22] Filed May 14, 1970
[45] Patented Nov. 9, 1971
[73] Assignee Rheem Manufacturing Company
 New York, N.Y.

[54] FOOD CONTAINER AND METHOD OF MAKING THE SAME
 7 Claims, 6 Drawing Figs.

[52] U.S. Cl. ................................................ 220/64,
 113/120 K, 219/91, 220/75, 220/77
[51] Int. Cl. ................................................ B65d 25/14
[50] Field of Search ........................................ 220/64, 79,
 77, 76, 75, 67; 219/91; 29/477, 477.7; 113/120 K

[56] References Cited
 UNITED STATES PATENTS
 1,227,596 5/1917 Eberhart .................. 220/64
 2,257,697 9/1941 McClary .................. 220/67
 2,354,532 7/1944 Martin .................... 220/67
 2,424,188 7/1947 Pearson ................... 220/75

Primary Examiner—Joseph R. Leclair
Assistant Examiner—James R. Garrett
Attorney—Joseph B. Gardner ABSTRACT: A shell or body tube for a relatively large container such as a tin-lined pail adapted for use in storing and shipping food products and the like, and a method of making such body tube. The method utilizes as the starting material a flat metal sheet plated along at least one side thereof with a layer of tin, and the sheet has longitudinal edge portions respectively terminating in unfinished edges. The plated sheet is bent upon itself along one longitudinal edge portion thereof to form a generally U-shaped section having the tin plating therealong facing outwardly; and the sheet is then formed into a tube having the longitudinal edge portions thereof overlapped and seam welded to each other in close proximity with the unfinished edge of the U-shaped section but on the side thereof at which there are only two juxtaposed layers of the metal sheet. The seam weld and temperature developed therefor are controlled so that the heat of fusion dissipating transversely through the body tube from the situs of the weld fuses the contiguous layers of tin plating along the U-shaped section, thereby isolating both of the unfinished longitudinal edges of the body tube from the interior thereof.

INVENTOR:
THOMAS D. TROUGHTON
BY: Joseph B. Gardner
ATTORNEY

FOOD CONTAINER AND METHOD OF MAKING THE SAME

DISCLOSURE

This invention relates to a food container and to a method of making the same; and it relates more particularly to the shell or body tube, and to a method of fabrication thereof, for a relatively large metal container intended for using in storing and shipping food products and the like.

It has long been known that food products attack the containers in which they are stored, and as concerns metal and particularly steel containers the attack thereon is attributable to a large measure to the organic acids in the food products. The acidic attack on the metal consumes the same and causes hydrogen gas to be involved in the process, thereby elevating the pressure within the container until the combination of the increased pressure and weakened surface areas of the container cause the latter to puncture or spring a leak at the weakest location. Once leakage occurs, the container and its contents are destroyed.

In order to reduce the rate of attack of the food acids on steel containers, it is conventional to plate at least the inner surfaces of each container with a coating or layer of tin which serves as a sacrificial cathode protecting the steel walls from direct attack until the tin has been consumed. The tin-plated inner surface of the food container provides a rather complex protective mechanism for the steel walls that involves barrier layers, a free tin layer, and very often an over coating of a synthetic plastic material that forms a supplemental barrier layer.

For the most part, metal containers of the type in which food products are shipped and sold have been of very limited volume with the number 10 can being about the largest container available for this purpose. The almost universal practice in fabricating such small metal containers is to roll flat steel into the tubular configuration defining the shells or body tubes for the containers after the sheets have been coated with tin plating, usually along each side thereof. The thin-gage metal sheets required for relatively small containers of the standard type are quite easy to work, and fabrication techniques have long been available for making the shells or body tubes for such containers without damaging the tin plating thereon—a critically necessary requirement. Commonly, the longitudinal edge portions of each plated metal sheet from which a body tube is to be formed are bent upon themselves into generally U-shaped configurations, and the free edges of the U-shaped sections are inserted one within another to form a lock seam. The seam is then pressed together, and a gasket material previously interposed between at least certain of the contiguous surfaces effects a fluidtight seal along such seam.

This technique has not been satisfactory for making the body tubes for the larger containers which have come into use in recent years because the gage or thickness of the metal sheets from which the larger body tubes are formed must be relatively great in order to withstand the weights of the large volumes of food products stored therein. As a consequence, such large containers, the 55 gallon drum being about the largest container presently used for shipping and storing food products but there being smaller counterparts known as "-pails," are fabricated by having the shells or body tubes thereof (which are usually but not necessarily cylindrical in cross section) formed from flat steel sheets each bent into a cylindrical configuration with the longitudinal edge portions thereof overlapped and welded together, thereby constraining the metal sheet in its tubular form and establishing a seal along the side seam defined by the overlapping edge portions. Thereafter, the interior of the shell is plated with a layer of tin to enable the shell to withstand attack thereon by the organic acids of the food products packaged within the completed container.

Although the large food containers manufactured by first forming and welding the overlapped edge portions of the steel sheet to construct the body tube and then plating the entire inner surface thereof with the necessary layer of tin are very satisfactory from the point of view of use, they are nevertheless quite costly to make because it is difficult and expensive to coat the inner surface of the body tube or shell after it has been formed. In view of this, an object of the present invention is to provide an improved food container of relatively large capacity, and especially the shell or body tube thereof, and also to provide an improved method of making the same from flat steel sheets that have previously been coated or plated along at least one side thereof with a layer of tin.

Another object of the invention is that of providing an improved shell or body tube for a large container adapted to receive and store food products and the like therein, and which body tube has the raw or unfinished longitudinal edges thereof isolated from the interior of the tube by fusion of the base metal of the sheet along only two juxtaposed layers thereof.

Still another object is in the provision of an improved shell or body tube of the type described in which one of the longitudinal edge portions of the sheet from which the tube is made, and which edge portions terminate in unfinished edges, is bent outwardly upon itself to provide a generally U-shaped section with the unfinished edge thereof remote from the interior of the body tube, the other longitudinal edge portion being disposed along the exterior of the U-shaped section to overlie the same and being fused to the underlying surface of the sheet beyond the unfinished edge of the U-shaped section but in close proximity therewith.

Yet another object is to provide a body tube of the character described for a relatively large container adapted to receive food products and the like therein, and in which the body tube prior to its formation is plated along the inner surface thereof with a heat-fusible protective coating such as tin-plate, the facing surfaces of the protective coating along the U-shaped section being fused so as to isolate the interior of the body tube thereat from the unfinished longitudinal edges of the sheet forming the same.

A further object of the invention is that of providing a method of making a body tube of the character described for a relatively large food container, and which method utilizes a portion of the residual heat conducted by the metal sheet from the restricted vicinity of the seam weld therealong to fuse the juxtaposed layers of protective coating along the U-shaped section so as to isolate thereat both of the unfinished longitudinal edges of the body tube from the interior thereof.

Additional objects and advantages of the invention, especially as concerns particular features and characteristics thereof, will become apparent as the specification continues.

An embodiment of the invention is illustrated in the accompanying drawing, in which.

Figure 3:
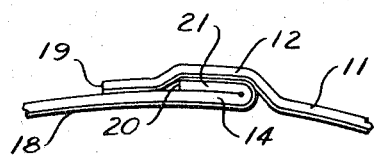
FIG. 3 is a broken end view in elevation illustrating the sheet after it has been formed into the tubular configuration defining the shell or body tube.
Figure 4:
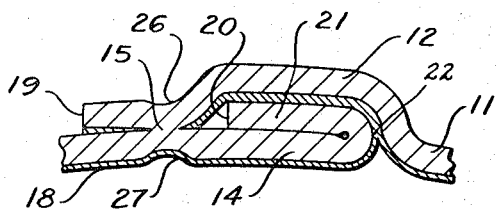
FIG. 4 is greatly enlarged transverse sectional view showing the overlapped longitudinal edge portions of the body tube after the seam-welding step.
Figure 6:
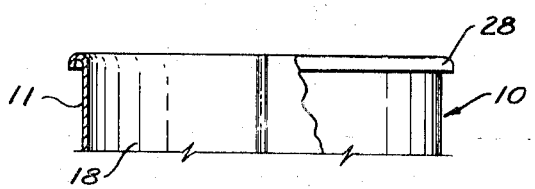
FIG. 6 is a broken side view in elevation, partly in section, showing the body tube after formation thereof.

In terms of its general or overall appearance, the shell or body tube and container embodying the same are quite similar to large containers presently in use. The shell differs, however, both as respects the characteristics of the side seam forming a part thereof and as respects the method by which the shell is fabricated. In FIG. 6 of the drawing, a shell or body tube is partially illustrated, and it is denoted generally with the numeral 10. The shell or body tube 10 is formed from a flat sheet of material 11 which has longitudinal edge portions 12 and 14 adapted to be overlapped, as shown in FIGS. 3 and 4, and integrated or fused as shown at 15 in FIG. 4 by a thermal-welding process which, for purposes hereof, may be essentially conventional.

Figure 5:
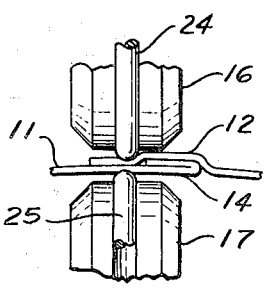
FIG. 5 is a broken end view in elevation similar to that of FIG. 3 but showing the welding electrodes in engagement with the sheet edge portions seam welded thereby.

In FIG. 5, standard rotatable welding electrodes 16 and 17 are shown which rollingly engage the respective longitudinal edge portions 12 and 14 to effect fusion thereof. The welding process practiced is a seam-welding technique in which the electrical resistance of the edge portions underlying the electrodes 16 and 17 is used to generate the temperature required to fuse the edges along the area 15 upon application thereto of the restricted compressive force developed thereagainst by the electrodes. Thus, no material is added to the edge portions 12 and 14 to effect joinder thereof, and the end result is a continuous seam therealong formed by utilizing conventional resistance welding techniques.

Figure 1:
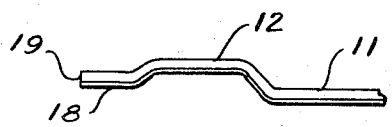
FIG. 1 is a broken view of a part of a sheet from which the body tube is formed illustrating one of the longitudinal edge portions thereof.
Figure 2:
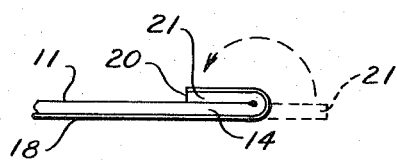
FIG. 2 is a broken end view in elevation of a part of such sheet illustrating the opposite longitudinal edge portion thereof which is bent upon itself to form a U-shaped section.

In all cases, the steel sheet 11 will be plated with a coating of tin along at least one side thereof (i.e., corresponding to the inside of the body tube 10) prior to formation of the body tube by shaping the same into the generally cylindrical form shown in FIG. 6, and then welding the overlapped longitudinal edge portions thereof. Usually, the sheet 11 will be plated prior to the longitudinal edge portions 12 and 14 thereof being configurated as shown in FIGS. 1 and 2, but as respects the present invention, the sheet could be plated with tin after such shaping of the edge portions 12 and 14. The sheet 11 in the orientation illustrated is coated along the underside thereof with tin plate, and for purposes of identification, the tin coating is designated with the numeral 18.

The longitudinal edge portions 12 and 14 respectively terminate in edges 19 and 20 which are raw or unfinished in the sense that they are not covered or protected by a coating of tinplate adequate to isolate the base metal of the sheet 11 from attack by contact of such edges with a food product stored within a container comprising the shell or tubular body 10 as a component thereof. As explained in detail hereinafter, the present invention isolates such unfinished edges 19 and 20 from the interior of the shell 10 so that any food product stored therewithin is prevented from contacting such edges.

Concerning the configuration of the longitudinal edge portions 12 and 14, the latter is bent outwardly and upon itself to provide a generally U-shaped section 21 that is pressed quite tightly against the underlying surface of the sheet 11, as shown best in FIGS. 2, 3 and 4. Since the section 21 is bent outwardly, the coating 18 of tinplate extends about and covers the exposed surface or base of the U-shaped section, and the unfinished edge 20 therealong is remote from the underside of the sheet 11 or interior of the body tube 10 after the sheet has been formed thereinto. The edge portion 12 may be pressed outwardly into a somewhat inverted, generally U-shaped configuration so as to seat in covering relation with the U-shaped section 21 when the longitudinal edge portions 12 and 14 are disposed in overlapping juxtaposition, as shown best in FIGS. 3 and 4. In this disposition of the edge portions 12 and 14, the unfinished edge 20 of the U-shaped section 21 is sandwiched between the two contiguous surface portions of the sheet 11 (i.e., the contiguous surface areas of the edge portions 12 and 14), and a bordering segment of the edge portion 12 extends beyond the unfinished edge 20.

As indicated hereinbefore, the longitudinal edge portions 12 and 14 are fused to each other beyond the unfinished edge 20 but in close proximity therewith, as shown best in FIG. 4. As a consequence, both of the unfinished edge portions 19 and 20 are isolated from the interior of the shell or body tube 10 by fusion of the base metal of the sheet 11 along the two juxtaposed layers thereof to form the seam 15. Moreover, the unfinished edges 19 and 20 are totally isolated from the interior of the body tube 10 by fusion of the tinplate 18 along the contiguous areas thereof generally indicated by the numeral 22 in FIG. 4, and which areas are located for the most part between the facing surfaces of the U-shaped section 21 and overlapped longitudinal edge portion 12.

In order to effect fusion of the base metal of the sheet 11 along the overlapped longitudinal edge portions 12 and 14 thereof, conventional seam-welding apparatus of any suitable type may be used. In the form shown in FIG. 5, the welding apparatus has electrodes 16 and 17 respectively equipped with copper wires or conductors 24 and 25 which serve as intermediate electrodes actually engaging the edge portions 12 and 14 of the sheet 11. The intermediate electrodes 24 and 25 are disposable and engage the workpiece only once, thereby obviating the effects of expansion of the electrodes which usually follows from engagement thereof with melted tin plating. Accordingly, in the present arrangement the profile of the welding electrodes remains constant as respects its engagement with the sheet 11. The welding apparatus used forms no part of the present invention, and a typical example of equipment found satisfactory are the Soundronic tinplate seam-welding machines (type RZd 12, for example) sold by the Soundronic Corporation of New York, New York. It will be observed in FIG. 4 that the once-through or disposable intermediate electrodes 24 and 25 form slight depressions 26 and 27 in the edge portions 12 and 14 as a consequence of the compressive force applied thereto during the welding operation.

The particular thickness of the metal sheet 11 used to form the body tube 10 will depend to a considerable extent upon the size or capacity of the container. By way of example, a container such as 10-gallon pail may be formed of 26 gage commercial quality cold rolled steel which has a midpoint gage range of 0.0175'. Alternatively, such 10-gallon pail might be formed from 135-pound-bias-box tin coated, black-plate steel having a thickness of about 0.0152 inches and being covered with a ½-pound coating of tin on each side thereof over the basis box area (i.e., 31,360 square inches). A larger container such as a 55-gallon drum used to ship and store food products might have the body tube thereof formed form 18 gage commercial quality cold rolled steel, the thickness of which at the midpoint of the gage range is 0.047 inches.

The extent to which the longitudinal edge portions 12 and 14 overlap each other may vary somewhat, but by way of example, the entire length of the edge portion 12 from the outer unfinished edge 19 thereof to the innermost curvature at which it meets the plane of the sheet 11 may approximate about three-sixteenths of an inch. In a typical fabrication line, the sheets 11 and body tubes formed therefrom are advanced between the welding electrodes 16 and 17 at a rate of about 35 to 40 feet per minute. The high value current passed through the overlapping edge portions 12 and 14 by the electrodes 16 and 17 elevates the temperature along the line of fusion 15 to the order of 2,400° F. which fuses or thermo welds such edge portions of the base metal forming the sheet 11 to each other.

In certain instances it may be desirable to prepare the edge portions 12 and 14 for the seam welding operation, but this depends to a great extent upon the type of welding equipment used. With the exemplary welding apparatus noted, edge preparation is not required. Where used, however, such preparation consist essentially of cleaning the surfaces of the overlapped edge portions 12 and 14 as by abrading the same with an abrasive wheel, belt or other abrasive grinder, or by shot-blasting techniques which has a peening effect on the metal—the latter being preferred because it does not gouge or scratch the metal which can weaken the same. Exemplary edge preparation equipment is not illustrated nor will it be further described because it precedes the welding electrodes 16 and 17, it is conventional in function and structure, and has been used heretofore in standard drum- and pail-forming lines. Similarly, the conveyor apparatus used to advance the sheet 11 and body tube 10 through the various fabrication stations is conventional and will not be considered herein.

Considering the fabrication process, a metal sheet 11 having unfinished longitudinal edges 19 and 20 and provided along one side with a heat fusible protective coating such as tinplate has the longitudinal edge portion 14 thereof bent upon itself to form the generally U-shaped section 21 along which the protective coating 18 faces outwardly. This step is illustrated in FIG. 2 in which the preivously—planar sheet 11 has the edge portion bent from the broken-line position shown into the U-shaped configuration desired. The longitudinal edge portion 12 is also deformed, where desired, so as to better accommodate the offset defined by the U-shaped section 21, as shown in FIGS. 1 and 3.

The sheet 11 is then formed into a tubular configuration having the longitudinal edge portions 12 and 14 thereof overlapping, as shown in FIG. 3, with the U-shaped edge portion 21 being the inner edge portion and the facing surfaces of the protective coating 18 adjacent thereto being in substantial engagement. The overlap of the edge portion 12 is sufficient to extend beyond the unfinished edge 20 of the U-shaped section 21 so as to provide two juxtaposed layers of the sheet 11 which can be welded to each other along a line of fusion 15.

Thereafter, the temperature of the juxtaposed longitudinal edge portions 12 and 14 are elevated along a narrow band beyond the unfinished edge 20 but in close proximity therewith to a value sufficient to seam weld the edge portions along such narrow band which is essentially defined by the area of fusion 15. Such fusion of the edge portions 12 and 14 constrains the sheet 11 in the generally cylindrical configuration of the body tube with the protective coating 18 thereon oriented along the inner surface of the tube. The compressive force defined between the electrodes 16 and 17 to effect fusion along the area 15 is sufficient to maintain the two juxtaposed layers of the sheet 11 in contiguous relation during the welding operation and, at the same time, to assure a good engagement of the edge portions 12 with the U-shaped section 21, as shown in FIG. 5, even in the absence of prior deformation of the edge portion 12 into the configuration thereof illustrated in FIG. 1.

The heat imparted to the edge portions 12 and 14 along the area of fusion 15, together with the rate at which the sheet 11 or body tube 10 is advanced between the electrodes 16 and 17, are controlled so that the magnitude and rate of the heat of fusion dissipating transversely through the sheet 11 from the weld seam 15 fuses the facing surfaces of the protective coating 18 generally along the U-shaped section 21, as shown at 22, to isolate both of the unfinished longitudinal edges of the body tube 10 from the interior thereof. As respects its fusion, a protective coating of tin has a melting temperature of approximately 450° F., so that the variable parameters determining the temperature throughout the area 22 are adjusted and controlled to provide a temperature somewhat in excess of this value. A temperature fairly close to the 450° F. melting temperature of tin is preferred although higher temperatures are tolerable. It has been found, however, that it is best to restrict the temperature of the body tube 10 to a value below about 500° F. wherever possible because temperatures much in excess thereof tend to oxidize the tin coating 18.

In addition to the welding temperature imparted to the overlapping edge portions 12 and 14 by the electrodes 16 and 17 and the rate at which the body tube 10 is advanced between the electrodes, the gage of the sheet 11 is a parameter that must be related thereto. That is to say, heat will dissipate much more rapidly from the welding situs 15 through thin metal then through thicker sheet stock, so that if the various parameters have been adjusted in a manner to provide successful fusion of the protective coating 18 throughout the contiguous area 22 therefor for a particular gage or metal thickness, the welding heat and rate of movement parameters may have to be adjusted if the gage of the sheet 11 is altered. Also, in certain instances it may be desirable to supplement the residual heat from the welding process in order to effect successful fusion along the area 22, and this is especially true in the case of containers being formed of thinner gage metal which dissipates the heat quite rapidly by conduction through the body tube 10 from the general site of the seam weld. Any means may be used to supply supplemental heat, such as an open flame burner as described in my copending U.S. Pat. application Ser. No. 25,637 filed Apr. 6, 1970.

After the body tube 10 has been completely fabricated in the manner described, it is used in the same way that a tube is employed which has been formed in accordance with the prior practice wherein the interior thereof is plated with a layer of tin after its formation. Accordingly, the body 10 ultimately will be equipped with end closures (not shown) which are sealingly secured thereto by the conventional techniques heretofore employed. In this respect, the ends of the body tube 10 may be flared or rolled outwardly, as shown at 28 in FIG. 6, so as to facilitate connection of the end closures therewith, all as is well known.

While in the foregoing specification an embodiment of the invention has been set forth in considerable detail for purposes of making a complete disclosure thereof, it will be apparent to those skilled in the art that numerous changes may be made in such details without departing from the spirit and principles of the invention.

What is claimed is:

1. A body tube for a container adapted to receive and store food products and the like therein, comprising a metal sheet having longitudinal edge portions terminating in unfinished edges and being formed into a tubular configuration defining said body tube, said longitudinal edge portions being disposed in overlapping relation and the inner thereof being bent outwardly and upon itself and providing a generally U-shaped section with the unfinished edge thereof remote from the interior of said body tube, the outer longitudinal edge portion of said body tube overlying said inner longitudinal portion thereof and extending beyond said U-shaped section and sandwiching the unfinished edge thereof between said edge portions, and said longitudinal edge portions being fused to each other beyond the unfinished edge of said U-shaped section but in close proximity therewith, whereby both of the unfinished longitudinal edges of said body tube are isolated from the interior thereof by fusion of the base metal of said sheet along only two juxtaposed layers thereof.

2. The body tube of claim 1 in which said metal sheet is plated along at least one side thereof with a heat-fusible protective coating, said coating being oriented along the inner surface of said body tube and facing outwardly along said U-shaped section thereof, the facing surfaces of said protective coating along said U-shaped section being fused to isolate the interior of said body tube thereat from said unfinished longitudinal edges.

3. The body tube of claim 2 in which said protective coating is tinplate.

4. The body tube of claim 3 in which the outer longitudinal edge portion of said body tube is shaped to conform generally to the contours of the inner longitudinal edge portion underlying the same.

5. In a method of making the body tube for a metal container adapted to receive and store food products and the like therein from a metal sheet terminating in unfinished longitudinal edges and plated along one side with a heat-fusible protective coating, the steps of bending a longitudinal edge portion of such sheet upon itself to form a generally U-shaped section in which said protective coating therealong faces outwardly, forming the sheet into a tubular configuration having the longitudinal edge portions thereof overlapping with said U-shaped section being the inner edge portion and the facing surfaces of said protective coating adjacent thereto being in substantial engagement and with the outer edge portion of the sheet extending beyond said U-shaped section, elevating the temperature of said edge portions along a narrow band beyond the unfinished edge of said U-shaped section but in close proximity therewith to a value sufficient to seam weld the edge portions along said band and thereby constrain the sheet in tubular form with the protective coating thereon oriented along the inner surface thereof, and controlling the value of the temperature effecting such seam weld so that welding heat dissipating transversely through said body tube from said band fuses the facing surfaces of said protective coating along said U-shaped section to isolate both of the unfinished longitudinal edges of said body tube from the interior thereof.

6. The method of claim 5 in which the step of elevating the temperature of said overlapping edge portions is effected by resistance welding the same along said narrow band.

7. The method of claim 6 in which said protective coating is tinplate, and in which the temperature is controlled to a value at least as great as the reflow temperature of said tinplate.

* * * * *